United States Patent

Faul et al.

Patent Number: 5,274,011
Date of Patent: Dec. 28, 1993

[54] CATIONIC RESINS BASED ON COPOLYMERS OF BUTADIENE AND ACRYLONITRILE

[75] Inventors: Dieter Faul, Bad Duerkheim; Gerhard Hoffmann, Otterstadt; Klaus Huemke, Friedelsheim; Ulrich Heimann, Muenster, all of Fed. Rep. of Germany

[73] Assignee: BASF Lacke+Farben Aktiengesellschaft, Muenster, Fed. Rep. of Germany

[21] Appl. No.: 964,822

[22] Filed: Oct. 22, 1992

[30] Foreign Application Priority Data

Oct. 25, 1991 [DE] Fed. Rep. of Germany ....... 4135239

[51] Int. Cl.$^5$ ............................................. C08L 63/02
[52] U.S. Cl. ................................. 523/414; 204/181.4; 428/458; 528/339
[58] Field of Search .............. 523/414; 428/458; 204/181.4; 528/339

[56] References Cited

U.S. PATENT DOCUMENTS 4,769,420  9/1988  Schwerzel et al. ............. 525/113

FOREIGN PATENT DOCUMENTS 385300  9/1990  European Pat. Off. .

Primary Examiner—Melvyn I. Marquis
Assistant Examiner—D. Aylward
Attorney, Agent, or Firm—Keil & Weinkauf

[57] ABSTRACT

Cationic resins are obtainable by reaction of
  A) a carboxyl-containing copolymer containing as comonomers
     a) 35-100 mol % of butadiene,
     b) 0-45 mol % of acrylonitrile, and
     c) 0-20 mol % of further comonomers, which has an average molecular weight of 500-50,000 and carries on average from 1.5 to 4 carboxyl groups per molecule, and
  B) a condensation product of
     d) a polybasic aliphatic $C_{10}$–$C_{100}$-carboxylic acid, and
     e) an amine which is polyfunctional in respect of primary and secondary amino groups,
  the amount of e) having been determined in such a way that, arithmetically, there are from 1.05 to 4 amino groups for every carboxyl group of d),
with the proviso that the amount of B) is chosen in such a way that there are from 1.05 to 4 mol of amino groups per mole of the carboxyl groups present in A).

6 Claims, No Drawings

CATIONIC RESINS BASED ON COPOLYMERS OF BUTADIENE AND ACRYLONITRILE

The present invention relates to cationic resins obtainable by reaction of

A) a carboxyl-containing copolymer containing as comonomers
   a) 35–100 mol % of butadiene,
   b) 0–45 mol % of acrylonitrile, and
   c) 0–20 mol % of further comonomers,
which has an average molecular weight of 500–50,000 and carries on average from 1.5 to 4 carboxyl groups per molecule, and B) a condensation product of
   d) a polybasic aliphatic $C_{10}$–$C_{100}$-carboxylic acid, and
   e) an amine which is polyfunctional in respect of primary and secondary amino groups,
   the amount of e) having been determined in such a way that, arithmetically, there are from 1.05 to 4 amino groups for every carboxyl group of d),
the proviso that the amount of B) is chosen in such with the proviso that the amount of B) is chosen in such a way that there are from 1.05 to 4 mol of amino groups per mole of the carboxyl groups present in A).

The invention also relates to the preparation of these resins, to the use thereof as binder constituent for electrocoating and also to the coated articles obtainable thereby.

To prepare electrocoating baths, the amino-containing binders and binder mixtures are protonated and then dispersed in water. Coating is effected by dipping the metallic article connected as the cathode, for example a metallic automobile body, into the electrocoating bath. Under the influence of the electric field the cationically dispersed paint particles move to the metallic substrate, where they become deposited on losing their electric charge.

After the deposition has ended, the coating thus obtained is subjected to a thermal crosslinking reaction.

The coatings thus obtained and hence also the binders themselves have to meet various quality requirements, for example in respect of adhesion, corrosion protection, chemical resistance and mechanical stability. However, in practice it is impossible to achieve the particular optimal values for all these properties at one and the same time, since the binder requirements are largely contradictory.

For instance, good corrosion protection would argue for binders having a relatively high glass transition temperature, but the coatings obtainable therewith are relatively brittle, so that their impact strength leaves something to be desired.

EP-A-385 300 discloses resins which, used as additives to the customary cationic binders for electrocoating, bring about an improvement in the impact strength of the coatings obtainable therewith. These additives are copolymers of butadiene and acrylonitrile with terminal carboxyl groups which are initially reacted with a low molecular weight diamine and then with an epoxy resin in a polymer-analogous manner.

It is an object of the present invention to find binder additives which lead to a further improvement in the electrophoretically produced coatings.

We have found that this object is achieved by the resins defined at the beginning.

The copolymers A) contain 35–100, preferably 60–95, mol % of butadiene, 0–45, preferably 10–30, mol % of acrylonitrile and if desired, to modify their properties, up to 20 mol % of further monomers such as styrene and vinyl acetate. The mole percentages are each based on the total comonomer content. The copolymers A) can be prepared with the aid of customary initiators and regulators, for example with the aid of tert-butyl peroctoate and tert-butyl perpivalate, which, as will be known, are substantially incorporated in the course of the polymerization as copolymerized units.

They contain from 1.5 to 4 carboxyl groups, preference being given to polymers with 2 carboxyl groups, which are usually terminal.

The carboxyl groups can be introduced into the copolymer by using carboxylated initiators, for example 4,4'-azobis(4-cyanoisobutyric acid), as is the case for example with the butadiene-acrylonitrile copolymer Hycar® CTBN 1300 from B. F. Goodrich.

However, the copolymer A) can also be prepared by copolymerization with corresponding amounts of an olefinically unsaturated acid such as acrylic acid.

Preferably, the copolymers A) have a number average molecular weight within the range from 500 to 50,000, in particular from 1,000 to 10,000.

Component B) is a condensation product of a polybasic aliphatic $C_{10}$–$C_{100}$-carboxylic acid (d) and a polyamine.

Suitable acids (d) are in particular dicarboxylic acids, for example $\alpha,\omega$-dicarboxylic acids having from 10 to 18 carbon atoms, but especially dimeric and oligomeric fatty acids derived from natural $C_{10}$–$C_{24}$-fatty acids or mixtures thereof.

Dimeric and oligomeric fatty acids are known and are mostly commercially available. Examples of such acids are linseed oil fatty acid (linoleic acid, linolenic acid), oleic acid and also the corresponding dimers.

The acid number of the acids (d) lies within the range from 100 to 500.

Suitable polyamines (e) are in particular non-aromatic diamines having a molecular weight of from 50 to 300. Such amines are for example alkanediamines such as tetramethylenediamine, hexamethylenediamine and decanemethylenediamine and also aliphatic diamines with ether groups such as 1,14-diamino-4,11-dioxatetradecane or oligomers of ethylene oxide or propylene oxide with terminal amino groups. It is also possible to use diamines having a cyclic structure, such as piperazine (1,4-diaminocyclohexane) and 2-aminoethylpiperazine.

Aromatic amines can also be used, but preferably only mixed with nonaromatic amines. It is true that aromatic amines in general produce a harder coating, but at the same time they reduce the elasticity, which is usually less desirable.

The same consideration applies to higher amines, which can be used only in such proportions that the resulting resins still remain soluble. Furthermore, amines with primary amino groups are preferred, but it is also possible to use amines with secondary amino groups. Tertiary amino groups may likewise be present, but in the present context they count as inert substituents, since they do not take part in the amidation reaction.

Amines (e) are likewise commercially available.

The components (d) and (e) are reacted with one another in such amounts that, arithmetically, there are from 1.05 to 4, preferably from 1.5 to 2.5, amino groups of (e) per carboxyl group of (d).

The reaction of acids (d) and amines (e) can be carried out in a conventional manner by reacting the components with one another in a high boiling solvent at 130°-250° C., for which the amine should always be present in excess and the water of reaction is advantageously removed continuously from the reaction mixture. Suitable solvents are for example toluene or xylene in the customary amounts.

The resulting component B) is a di- or more than difunctional high molecular weight amide-amine of predominantly aliphatic character.

The reaction of the copolymer A) with the amide-amine component B) can be effected in the same way as the preparation of the components B), making further details superfluous.

The amounts of A) and B) are to be determined in such a way that the carboxyl functions of A) are amidated virtually completely by the amine functions of B) and that the condensation product still contains on average from 1 to 4 primary or secondary amino groups per mole.

These remaining amino groups ensure the cationic character of the resin and hence its suitability as a binder ingredient for electrocoating, and they are also necessary to make curing by crosslinking possible after deposition.

It is true that the resins of the invention can be used as sole binder for electrocoating, but this will produce very soft coatings which are likely to be wanted only in exceptional circumstances. They are on the other hand of significantly greater importance for use as binder additives, ie. as binder component mixed with other binders—the base resins—with the proportion of additives, based on the total amount of binder (i.e. without additional crosslinking component and other substances), being in general from 5 to 30, preferably 5-20, % by weight.

Used as binder additives, the resins of the invention may either be dispersed together with the base resins as partly compatible mixtures or be added as separate dispersion to the ready-prepared base resin dispersion.

The resins of the invention can be dispersed in water by complete or partial neutralization with an acid. Suitable acids are organic acids such as lactic acid, acetic acid and formic acid, preferably acetic acid, or inorganic acids such as phosphoric acid. The aqueous dispersions may have solids contents of preferably 5-40, in particular 15-35, % by weight.

The base resins are basic polymers which contain primary, secondary or tertiary amino groups as basic groups. It is also possible to use base resins which carry phosphonium or sulfonium groups. In general, these base resins additionally contain functional groups, for example hydroxyl groups or olefinic double bonds.

Suitable base resins of this type, the molecular weight of which is preferably within the range from 2,000 to 200,000, are addition polymers, for example aminoacrylate and methacrylate resins, polyadducts such as aminopolyurethane resins and polycondensates such as aminoepoxy resins.

For base coatings having good corrosion protection properties the base resins used are preferably aminoepoxy resins. Aminoepoxy resins are described for example in EP-A-134 983, EP-A-165 556, EP-A-167 029, DE-A-34 22 457 or DE-A-34 44 410.

They are obtained in a conventional manner by reacting epoxy-containing resins with saturated and/or unsaturated primary and/or secondary amines or amino alcohols. Suitable epoxy resins are compounds having on average from 1.5 to 3, preferably 2, epoxy groups per molecule and average molecular weights of from 300 to 6,000.

Of particular suitability are glycidyl ethers of polyphenols which on average contain 2 hydroxyl groups per molecule, a particularly suitable phenol component being 2,2-bis(4-hydroxyphenyl)propane (bisphenol A).

Epoxy resins having a higher molecular weight are obtained by reacting the diglycidyl ethers mentioned with a polyphenol such as 2,2-bis(4-hydroxyphenyl)-propane.

The aminoepoxy resin can also be modified with saturated or unsaturated polycarboxylic acids, for example with adipic acid, fumaric acid or a dimeric fatty acid.

It is also possible to use base resins which additionally have been reacted with half-blocked isocyanates and have self-crosslinking properties. Such resins are described for example in EP-A-273 247 or U.S. Pat. No. 4,692,503.

If the base resins do not carry any self-crosslinking groups, a separate crosslinking component is required.

Suitable crosslinkers for these base resins are for example urea condensation products as described in DE-A-33 11 514 or phenolic Mannich bases as described in DE-A-34 22 457. EP-A-134 983 mentions as further possible crosslinkers blocked isocyanates or amino resins such as urea-formaldehyde resins, melamine resins or benzoguanamine resins.

Furthermore, the standard electrocoating baths may additionally contain pigment pastes and customary auxiliaries. Pigment pastes are obtainable for example from a grinding resin and pigments such as titanium dioxide, carbon black or aluminum silicates and also auxiliaries and dispersants. Suitable grinding resins are described for example in EP-A-107 089 or EP-A-251 772.

The base resin and the additive are preferably used in the form of aqueous dispersions, either separately or as common dispersion.

The deposition of the paint films in cathodic electrocoating is customarily effected at from 20° to 35° C., preferably at from 26° to 32° C., in the course of from 5 to 500 sec, preferably in the course of from 60 to 300 sec, at deposition voltages of from 50 to 500 V. The article to be coated is connected as the cathode.

The paint films can then be baked at from 120° to 210° C., preferably at from 140° to 180° C.

The coatings of the invention exhibit very good elasticity and corrosion resistance and are highly suitable for use as base coats for multilayer coating systems, upon which they confer not only good corrosion protection properties but also good resistance to mechanical stresses, for example stone chipping.

Such a multilayer coating system can be for example three-layered, in which case the cathodically deposited base coat has applied atop it a customary surface coat, for example based on polyester, followed by a top coat of a commercially available topcoating composition.

EXAMPLES I. Preparation of Fatty Amides B
General Method

Dimeric linseed oil fat acid (commercial product Pripol ® 1013 from Unichema, acid number 195) and a diamine were heated in the presence of about 10% by weight of xylene (based on the amount of acid and amine) at 190° C. with continuous removal of the water of reaction until the acid number of the mixture had dropped to zero, which took about 5-10 hours. Since the condensation products were intended for further reaction, they were left in the xylene. The details of these experiments are shown in the Table below.

| Ex. | Dimeric fatty acid Amount [g] | Diamine amount [g] | Amine number of condensation product [mg KOH/g] |
|---|---|---|---|
| B/1 | 870 | 2-Aminoethylpiperazine 388 | 271 |
| B/2 | 580 | 2-Aminoethylpiperazine 388 | 418 |
| B/3 | 1625 | Hexamethylendiamine 465 | 142 |
| B/4 | 928 | Hexamethylendiamine 348 | 275 |
| B/5 | 580 | 1,14-Diamino-4,11-di-oxatetradecane 464 | 114 |
| B/6 | 290 | Jeffamine ® D230[1] 237 | 111 |
| B/7 | 290 | Jeffamine ® D400[1] 448 | 82 |
| B/8 | 290 | Jeffamine D2000[1] 246 | 24 |

[1] these products from Texaco Chem. Comp. are 1,2-propylene oxide oligomers having 2 terminal amino groups whose average molecular weight is 230 or 400 or 2000.

II. Preparation of Binder Additives General Method Examples 1 TO 8

A copolymer from Goodrich (Hycar® CTBN1300X13, acid number 32) composed of 74 mol % of butadiene and 26 mol % of acrylonitrile and having an average molecular weight of 3200 and also 2 terminal carboxyl groups per molecule (component A) was heated in the presence of 15% by weight of xylene (based on the amount of copolymer and component B) with a componet B at 190° C. with continuous removal of the water of reaction until the acid number of the mixture had dropped to about 1–4 (reaction time about 3–8 hours). The details of these Examples are revealed in the following Table:

| | | | Binder additive | | |
|---|---|---|---|---|---|
| Ex. | Component A Amount [g] | Component B Amount [g] | Amine number [mg of KOH/g] | Acid number [mg of KOH/g] | K value[2] |
| 1 | 414 | B/1 859 | 67 | 1.3 | 35 |
| 2 | 714 | B/2 3436 | 43 | 0.9 | 31 |
| 3 | 315 | B/3 687 | 22 | 3.5 | 49 |
| 4 | 890 | B/4 3436 | 18 | 2.6 | 54 |
| 5 | 1969 | B/5 3436 | 21 | 2.4 | 55 |
| 6 | 202 | B/6 344 | 24 | 2.0 | 32 |
| 7 | 275 | B/7 344 | 22 | 1.8 | 35 |
| 8 | 459 | B/8 172 | 12 | 2.6 | 30 |

[2] according to Fikentscher

III. Preparation of Electrocoating Baths 1. Preparation of Binder a1) A mixture of 5800 g of hexamethylenediamine, 7250 g of dimeric linseed oil fatty acid and 1400 g of linseed oil fatty acid was gradually heated to 195° C., the resulting water of reaction (about 540 g) being distilled off. The mixture was then cooled back to 100° C. and eluted with 5961 g of toluene to a solids content of 70% by weight. The product had an amine number of 197 mg of KOH/g.

a2) 4850 g of a diglycidyl ether based on 2,2-bis(4-hydroxyphenyl)propane (bisphenol A) having an epoxy equivalent weight of 485 were dissolved in a mixture of 1039 g of toluene and 1039 g of isobutanol by heating to 80° C. The resulting solution was admixed at 60° C. with a solution of 300 g of N-methyl-N-hydroxyethylamine and 128 g of isobutanol to form with heating an addition product which was subsequently admixed with 1850 g of the toluene solution obtained according to a1). The resulting reaction mixture was heated at 80° C. for 2 hours.

2. Preparation of Crosslinker

A mixture of 1.32 kg of toluene, 0.42 kg of trimethylolpropane and 0.72 kg of bisphenol A was stirred at 60° C. until a homogeneous solution had formed. This solution was added to a 60° C. mixture of 3.45 kg of isophorone diisocyanate, 0.86 kg of toluene and 0.0034 kg of dibutyltin dilaurate. The mixture was held at 60° C. for 2 hours and was then admixed with 2.0 kg of dibutylamine, the rate of addition having been set such that the temperature of the reaction mixture did not exceed 80° C. Then 1.11 kg of toluene were added, whereafter the solution was held at 80° C. for 1 hour.

3. Preparation of Pigment Paste

A mixture of 526 g of the binder obtained according to III.1., 169 g of ethylene glycol monobutyl ether, 600 g of water and 16.5 g of acetic acid was ground together with 800 g of titanium dioxide, 11 g of carbon black and 50 g of basic lead silicate in a ball mill until the average particle size of the pigment particles was 9 μm. The paste was then adjusted with water to a solids content of 47% by weight.

4. Preparation of Electrocoating Dispersions a) Preparation of electrocoating dispersions E 1 to E 8

General method 730 g of the binder of III.1., 365 g of the crosslinker of III.2. and 170 g of an additive according to Examples 1 to 8 were dispersed in the form of their as-prepared solutions in 1690 g of water in the presence of 20 g of acetic acid, whereupon the solvents were distilled off as water-containing azeotropes. The solids content of the dispersion was then adjusted with water to 33% by weight.

b) Preparation of additive dispersion A1

428.6 g of an additive of Example 1 were dissolved in 61.7 g of ethylene glycol monobutyl ether and 109.7 g of isobutanol. This solution was neutralized at 45° C. with 10.7 g of concentrated acetic acid and dispersed in 900 g of water. Then 400 g of a solvent-water azeotrope were distilled off at 40° C. and 80 mbar. The solids content of the dispersion was 26.9% by weight.

c) Preparation of additive dispersion A2

400 g of a 50% by weight solution of an additive of Example 2 in a mixture of 60 g of xylene, 40 g of ethylene glycol monobutyl ether and 100 g of isobutanol were neutralized at 45° C. with 4.6 g of acetic acid and dispersed in 600 g of water. Then about 90 g of a solvent-water azeotrope were distilled off at 40° C. and 80 mbar. The resulting dispersion had a solids content of 24.2% by weight.

d) Preparation of additive dispersion A3

600 g of a 50% by weight solution of an additive of Example 3 in a mixture of 53 g of xylene, 53 g of ethylene glycol monobutyl ether and 194 g of isobutanol were neutralized at 45° C. with 5 g of acetic acid and dispersed with 900 g of water. Then about 400 g of a solvent-water azeotrope were distilled off at 40° C. and 80 mbar. The solids content of the dispersion was 20% by weight.

e) Preparation of electrocoating dispersion E 0 (base resin + crosslinker)

700 g of a binder as per III.1. and 300 g of a crosslinker as per III.2. were neutralized with 19 g of acetic acid and dispersed in 1350 g of water, whereupon the solvents still present were distilled off as water-containing azeotropes. Then a solids content of 35% by weight was set with water.

5. Preparation of Electrocoating Baths No. 0 to 11 a) No. 0 to 8

The dispersions E 0 to E 8 were mixed with 775 g of the pigment paste of III.3. and made up with water to a volume of 5000 ml.

b) No. 9 to 11

To an electrocoating bath prepared as per a) using dispersion E 0 were added the additive dispersions A1 to A3 in the following amounts:

electrocoating bath No. 9: E 0 + 476 g of A1
electrocoating bath No. 10: E 0 + 529 g of A2
electrocoating bath No. 11: E 0 + 641 g of A3

6. Electrophoretic Coating

Paint films were deposited at a deposition voltage U[V] onto cathodically connected zinc phosphatized steel test panels in the course of 2 min. These paint films were then thermally cured at 160° C. in the course of 20 min.

Then the impact strength was tested to ASTM D2794 by measuring the reverse impact with a mandrel impact tester from Gardner.

The results of these experiments are listed in Table III.

TABLE III

| Electrocoating bath No. | U [V] | Film thickness [μm] | Reverse impact [Nm] |
| --- | --- | --- | --- |
| 0 | 300 | 24.6 | <2.3 |
| 1 | 300 | 25.0 | 13.6 |
| 2 | 300 | 24.5 | 18.1 |
| 3 | 200 | 25.0 | 6.8 |
| 4 | 300 | 27.7 | 4.5 |
| 5 | 320 | 26.5 | 5.7 |
| 6 | 300 | 26.0 | 18.1 |
| 7 | 270 | 26.0 | 18.1 |
| 8 | 270 | 27.5 | 15.8 |
| 9 | 290 | 23.5 | 13.6 |
| 10 | 270 | 24.7 | 11.3 |
| 11 | 250 | 25.0 | 5.7 |

We claim:

1. Cationic resins obtained by reacting
   A) a carboxyl-containing copolymer containing as comonomers
      a) 35–100 mol % of butadiene,
      b) 0–45 mol % of acrylonitrile, and
      c) 0–20 mol % of further comonomers,
      which has an average molecular weight of 500–50,000 and carries on average from 1.5 to 4 carboxyl groups per molecule,
      and
   B) a condensation product of
      d) a polybasic aliphatic $C_{10}$–$C_{100}$-carboxylic acid, and
      e) an amine which is polyfunctional in respect of primary and secondary amino groups,
      the amount of e) having been determined in such a way that, arithmetically, there are from 1.05 to 4 amino groups for every carboxyl group of d),
   with the proviso that the amount of B) is chosen in such a way that there are from 1.05 to 4 mol of amino groups per mole of the carboxyl groups present in A).

2. Cationic resins as claimed in claim 1, whose component A) is a butadiene-acrylonitrile copolymer having an acrylonitrile content of from 5 to 45% by weight where every molecule carries on average from 1.5 to 4 carboxyl groups.

3. A process for preparing cationic resins as claimed in claim 1, which comprises reacting
   A) a carboxyl-containing copolymer containing as comonomers
      a) 35–100 mol % of butadiene,
      b) 0–45 mol % of acrylonitrile, and
      c) 0–20 mol % of further comonomers,
      which has an average molecular weight of 500–50,000 and carries on average from 1.5 to 4 carboxyl groups per molecule, with
   B) a condensation product of
      d) a polybasic aliphatic $C_{10}$–$C_{100}$-carboxylic acid, and
      e) an amine which is polyfunctional in respect of primary and secondary amino groups,
      the amount of e) having been determined in such a way that, arithmetically, there are from 1.05 to 4 amino groups for every carboxyl group of d),
   in the presence of organic solvents at 130°–250° C., with the proviso that the amount of B) is chosen in such a way that there are from 1.05 to 4 mol of amino groups per mole of the carboxyl groups present in A).

4. Aqueous dispersions containing 5–40% by weight of a cationic resin as claimed in claim 1.

5. Electrocoating baths containing, based on the total polymer content, 5–30% by weight of the cationic resins as claimed in claim 1 as binder additives.

6. A cathodically electrocoated article obtained using an electrocoating bath as claimed in claim 5.

* * * * *